United States Patent [19]

Kovar et al.

[11] 4,086,232

[45] Apr. 25, 1978

[54] BIS-ETHYNYL HETEROCYCLIC COMPOSITIONS AND METHOD OF SYNTHESIS

[75] Inventors: Robert F. Kovar, Dayton; Fred E. Arnold, Centerville, both of Ohio

[73] Assignee: The United States of America as represented by the Secretary of the Air Force, Washington, D.C.

[21] Appl. No.: 754,042

[22] Filed: Dec. 23, 1976

Related U.S. Application Data

[62] Division of Ser. No. 612,078, Sep. 10, 1975, Pat. No. 4,022,746.

[51] Int. Cl.$^2$ .................. C07D 241/42; C08K 5/34
[52] U.S. Cl. ................................................ 260/250 Q
[58] Field of Search ................................... 260/250 Q

[56] References Cited

U.S. PATENT DOCUMENTS

| 3,966,729 | 6/1976 | Kovar et al. ............... 260/250 Q |
| 4,005,144 | 1/1977 | Kovar et al. ............... 260/250 Q |

*Primary Examiner*—Donald G. Daus
*Assistant Examiner*—M. L. Berch
*Attorney, Agent, or Firm*—Joseph E. Rusz; Cedric H. Kuhn

[57] ABSTRACT

Bis-ethynyl quinoxaline compositions are prepared by the condensation reaction of an aromatic diglyoxyl or dibenzil with an ethynyl-substituted aromatic ortho-diamine. The compositions are useful as polymerizable plasticizers for heterocyclic thermoplastic resins in the fabrication of composites. Polymerizable plasticizers are materials that remain fluid and act as a plasticizer during early stages of fabrication and then polymerize to a rigid resin.

6 Claims, No Drawings

BIS-ETHYNYL HETEROCYCLIC COMPOSITIONS AND METHOD OF SYNTHESIS

RIGHTS OF THE GOVERNMENT

The invention described herein may be manufactured and used by or for the Government of the United States for all governmental purposes without the payment of any royalty.

This is a division, of application Ser. No. 612,078, filed Sept. 10, 1975, now U.S. Pat. No. 4,022,746.

FIELD OF THE INVENTION

This invention relates to bis-ethynyl quinoxaline compositions. In one aspect it relates to a method for synthesizing the compositions. In another aspect, it relates to a thermoplastic polymer composition.

BACKGROUND OF THE INVENTION

In recent years there has been an increase in interest in the utilization of thermoplastic resins to reduce the processing cost of fiber-reinforced composites. Thermoplastic matrices offer the possibility of lessening the fabrication costs of advanced structures thereby making them cost competitive. The cost reductions are possible because faster and lower cost manufacturing procedures can be employed.

Since such resins must be processed in the melt under conditions where considerable flow is required, processing temperatures must, unfortunately, be considerably higher than ultimate use temperatures. This limitation presents a serious problem when the thermoplastic resins are considered for use in higher temperature environments. Reactive plasticizers provide a promising solution to this problem.

Reactive plasticizers lower the effective softening point of the thermoplastic resin during processing and then, during a final curing step, they react to form a crosslinked resin. Raising the softening temperature of the mixture to a temperature above the softening point of the neat thermoplastic can result if the molecular structure of the system is appropriately tailored.

It is an object of the present invention, therefore, to provide new and improved reactive plasticizers for use in the fabrication of heterocyclic thermoplastic resins.

Another object of the invention is to provide bis-ethynyl quinoxaline compositions.

A further object of the invention is to provide a method for synthesizing bis-ethynyl quinoxaline compositions.

Still another object of the invention is to provide a mixture of a polyphenyl quinoxaline thermoplastic and a plasticizer, the cured mixture having a higher softening temperature than the thermoplastic per se.

Other objects and advantages of the invention will become apparent to those skilled in the art upon consideration of the accompanying disclosure.

SUMMARY OF THE INVENTION

The present invention resides in a bis-ethynyl quinoxaline compound having the following formula:

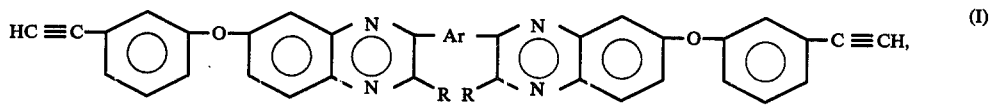

wherein Ar is a divalent aromatic radical and R is hydrogen or a monovalent aromatic radical.

Examples of divalent aromatic radicals include the following:

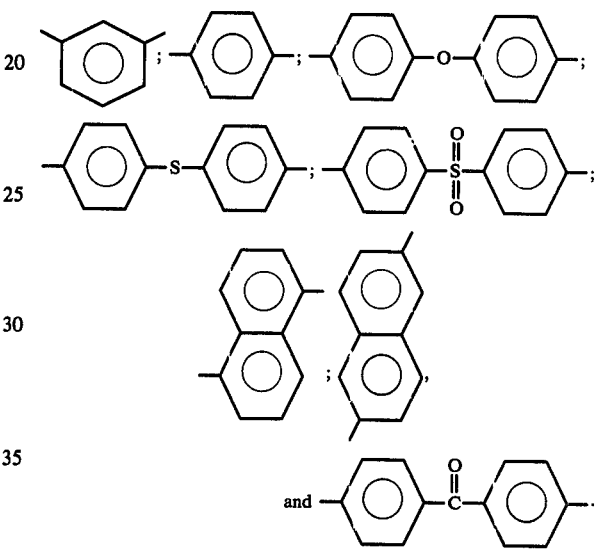

Exemplary monovalent aromatic radicals include the following:

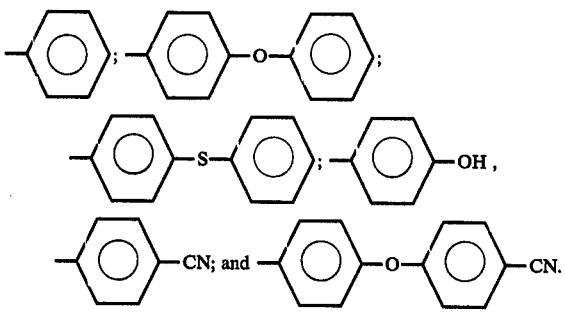

The quinoxaline compounds of this invention can be prepared by a three-step procedure. Firstly, 3-(3,4-diaminophenoxy)acetophenone (II) is reacted with an aromatic bis(1,2-dicarbonyl)compound (III) to give a bis-acetyl quinoxaline (IV). The 3-(3,4-diaminophenoxy)-acetophenone (II) is normally prepared and used in situ by catalytic reduction of 3-(3,4-dinitrophenoxy)acetophenone (V) with platinum oxide in absolute ethanol.

The above-described reactions can be represented by the following equation in which the Roman numerals designate the compounds referred to in the preceding paragraph:

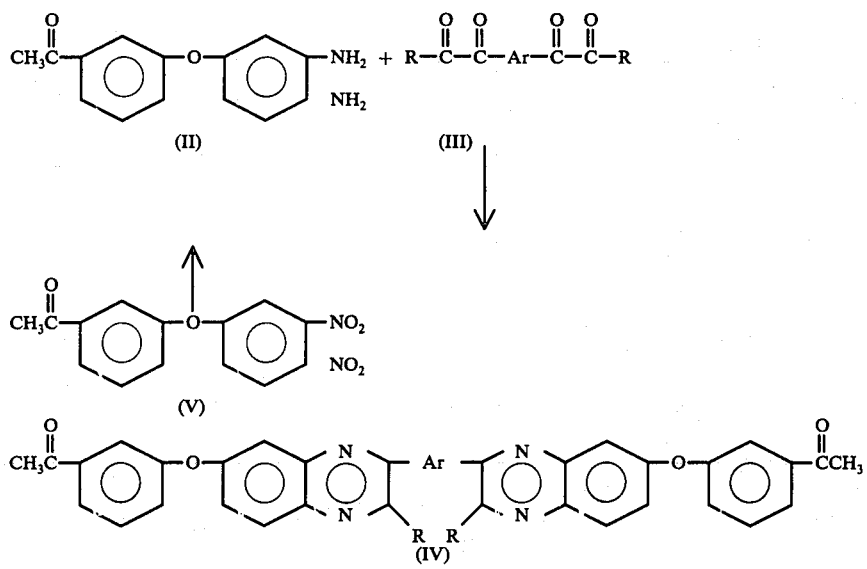

Secondly, the acetyl groups of compounds (IV) are converted to chlorocinnamaldehyde groups [compounds (VI)] by reacting with oxalyl chloride in dimethylformamide (DMF). Thirdly, hydrolysis of compounds (VI) with aqueous sodium hydroxide gives the bis-ethynyl quinoxaline compounds (I) of this invention.

The reactions described in the preceding paragraph can be represented by the following equations in which the Roman numerals designate compounds mentioned above:

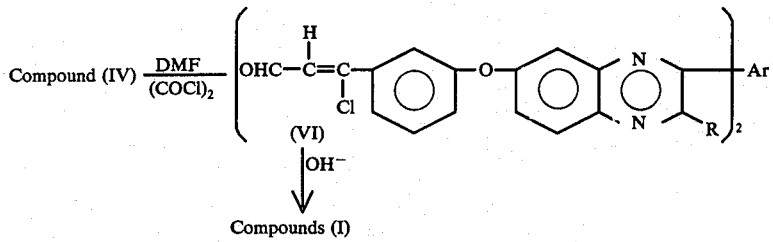

The quinoxaline compounds of this invention can also be synthesized directly by reacting an aromatic bis(1,2-dicarbonyl)compound with two moles of 4-(3-ethynyl-phenoxy)-o-phenylenediamine (VII). The reaction involved can be represented by the following equation:

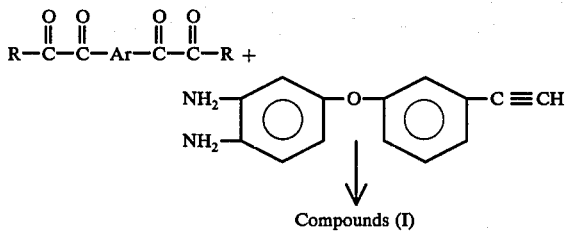

The preparation of 4-(3-ethynylphenoxy)-o-phenylenediamine is described in Example II hereinafter and in our copending application Ser. No. 578,847, filed on May 19, 1975, the disclosure of which is incorporated herein by reference.

In the foregoing equations, Ar and R are as defined hereinbefore.

Except for the phenylenediamine mentioned above, the starting materials employed in synthesizing the quinoxaline compounds are well known compounds that are described in the literature. Examples of bis(1,2-dicarbonyl) compounds that can be used include p,p'-oxydibenzil; p,p'-(phenylglyoxaloyl)diphenyl ether; 1,3-(phenylglyoxaloyl) benzene; p,p'-(phenylglyoxaloyl)benzene; p,p'-(phenylglyoxaloyl)diphenylsulfide; p,p'-(phenylglyoxaloyl)biphenyl; p,p'-(phenylglyoxaloyl)diphenylmethylene; p,p'-(phenylglyoxaloyl)diphenylsulfone; p,p'-(phenylglyoxaloyl)benzophenone; p,p'-(phenoxyphenylglyoxaloyl)benzene p,p'-(phenoxyphenylglyoxaloyl)diphenylsulfide;p,p'-(phenoxyphenylglyoxaloyl)biphenyl; p,p'-(phenoxyphenylglyoxaloyl)diphenylmethylene; p,p'-(phenoxyphenylglyoxaloyl)diphenylsulfone; p,p'-(phenoxyphenylglyoxaloyl)benzophenone; p,p'-(cyanophenylglyoxaloyl)benzene; p,p'-(glyoxaloyl)diphenyl ether; 1,3-(glyoxaloyl)benzene; p,p'-(glyoxaloyl)benzene; p,p'-(glyoxaloyl)diphenylsulfide; p,p'-(glyoxaloyl)-biphenyl; p,p'-(glyoxaloyl)diphenylmethylene; p,p'-(glyoxaloy)diphenylsulfone; p,p'-(glyoxaloyl)benzophenone; and the like.

The compounds of this invention are particularly useful as plasticizers for a polyphenyl quinoxaline thermoplastic having the following formula:

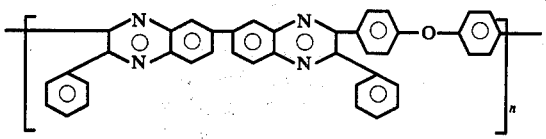

In the foregoing formula, n is an integer which can vary within a rather broad range, e.g., from about 10 to 200. This is a well known polymer that is described in the literature. It can be readily prepared from a solution condensation of diaminobenzidine and oxydibenzil. The amount of plasticizer used with the polymer usually ranges from about 5 to 30 weight percent, based upon the weight of the polymer.

A more complete understanding of the invention can be obtained by referring to the following illustrative examples which are not intended, however, to be unduly limitative of the invention.

EXAMPLE I

Preparation of p,p'-Bis[3-phenyl-6-(3-ethynylphenoxy)-quinoxalin-2-yl]-diphenylether.

(a) p,p'-bis[3-phenyl-6-(3-acetylphenoxy)-quinoxaline-2-yl]diphenylether.

To a hydrogenation bottle was added 10.0 g (28.6 mmole) of 3-(3,4-dinitrophenoxy)acetophenone and 250 ml of absolute ethanol. The suspension was purged with nitrogen, and then 150 mg of platinum oxide catalyst was carefully added. The flask was shaken under a hydrogen pressure of 55 psi until no further pressure drop was noticeable (4 hr). TLC at that point (SIO$_2$, eluted with ethylacetate) showed one major spot of reduced product (3-]3,4-diaminophenoxy]acetophenone) and only a small amount of impurity. The solution was filtered under nitrogen pressure, and the filtrate purged with nitrogen for 10 minutes. Then, 5.2 g (12 mmole) of p,p'-bis(phenylglyoxaloyl)diphenyl ether was added along with 5 ml of acetic acid, and the mixture refluxed under nitrogen for 1 hour. At that point the solvent was evaporated in vacuo, and the residue refluxed with 25 ml of m-cresol to complete the reaction. The m-cresol was distilled off in vacuo, and the residue dissolved in a minimum volume of methylene chloride. This solution was poured into 50 ml of refluxing ethanol, and the methylene chloride boiled off. The precipitated product was filtered and air dried. TLC (S$_i$O$_2$-elution with CH$_2$Cl$_2$) showed a highly fluorescent first spot of high Rf which was subsequently identified as the product. The solid product was purified by repeated recrystallization from methanol/CH$_2$Cl$_2$ mixtures, in which the methylene chloride was boiled away. High purity material was obtained by chromatography on a dry column of silica gel (quartz column). Elution of the column with methylene chloride afforded a first band (fluorescent) containing the product. Evaporation of solvent in vacuo yielded p,p'-bis[3-phenyl-6-(3-acetylphenoxy)quinoxaline-2-yl]-diphenylether as an amorphus pale yellow solid, m.p. 100° C (foaming).

Calc'd for C$_{56}$H$_{38}$N$_4$O$_5$: C,79.42; H,4.52; N,6.62
Found: C,79.08; H,4.33; N,6.51

(b) p,p'-Bis[3-phenyl-6-(3-ethynylphenoxy)-quinoxaline-2-yl]-diphenylether.

A 250 ml round bottomed one-necked flask equipped with magnetic stirrer and nitrogen inlet adapter was thoroughly flamed and purged with nitrogen. To this was added 25 ml of anhydrous DMF. The flask was cooled with stirring under nitrogen to −78° C, and then 2.5 g (20 mmole) of freshly distilled oxalyl chloride was added dropwise to the flask to minimize the violent reaction. A white precipitate of Vilsmeyer complex formed in the flask. After the addition the reaction mixture was stirred at 0° for 15 minutes at which time 5.0 g (6.9 mmole) of p,p'-bis[3-phenyl-6-(acetylphenoxy)-quinoxaline-2-yl]-diphenyl ether was added to the flask. The flask was allowed to warm to room temperature, and was then stirred at 50° for one half hour. The contents of the flask were poured into 500 ml of cold, saturated sodium bicarbonate solution, and the crude product which precipitated was filtered, washed with water and dried. The material thus obtained could be used directly for the next step, or could be purified by chromatography on a column of silica gel (elution with methylene chloride).

To a refluxing solution of sodium hydroxide (5 g) in 40 ml of water was added a solution of p,p'-bis[3-phenyl-6-(3-α-chlorocinnaldophenoxy)-quinoxaline-2-yl]-diphenylether (4 g) dissolved in 10 ml of dioxane. The mixture was refluxed for one half hour, at which time TLC showed the reaction to be virtually complete. The reaction mixture was poured into 1 liter of water, and the solution acidified with 50% sulfuric acid. The cooled solution was extracted with several portions of methylene chloride, and the combined extracts evaporated to near dryness in vacuo. The residue was chromatographed on a 1 × 12 inches dry column of silica gel (quartz column) (eluted with CH$_2$Cl$_2$/hexane). Band 1 (highly fluorescent in UV) contained the desired product, m.p. 98°–99°.

Calc'd for C$_{56}$H$_{34}$N$_4$O$_3$: C,82.95; H,4.23; N,6.91
Found: C,82.53; H,4.20; N,6.67

EXAMPLE II

Preparation of 3-(3-Ethynylphenoxy)-o-phenylenediamine (a) 3'-Acetyl-3,4-dinitrophenyl ether.

To a solution containing 8.0 g (67 mmoles) of m-hydroxyacetophenone dissolved in 50 ml of dry pyridine was added 2.8 g (approximately 67 mmoles) of solid sodium hydride (57% dispersion in mineral oil). The resulting mixture (frothing) was stirred at room temperature for 3 hours, at which time the flask was cooled to 0° C, and 15 g (75 mmoles) of solid 3,4-dinitrofluorobenzene was added all at once. The reaction mixture was allowed to warm to room temperature, and was then heated at 100° C for an additional hour. The contents of the flask were then poured into one liter of water and the resulting mixture extracted with two 100 ml portions of methylene chloride. The combined extracts were washed with two portions of 5% HCL solution and the organic phase evaporated to a volume of 50 ml. The concentrated solution of crude product was filtered through a 2 × 4 inches dry column of silica gel (Voelm) which was eluted with methylene chloride. The eluate was evaporated to dryness, and the residue rechromatographed on a 2 × 12 inches dry column of silica gel. Elution with 1:1 methylene chloride:hexane removed a first band of impurities. Further elution using methylene chloride produced a second band containing the product. Evaporation of the eluate to dryness, and recrystallization of the residue from methylene chloride/absolute ethanol afforded 11.7 g (58%) of yellow crystals, m.p. 140°–141° C. Large crystals of high purity material were obtained by slow spontaneous evaporation of concentrated methylene chloride solutions of 3'-acetyl-3,4-dinitrophenyl ether.

Analysis: Calc'd for $C_{14}H_{10}N_2O_6$: C,55.65; H,3.31; N,9.27 Found: C,55.43; H,3.20; N,9.29

(b) m-(3,4-Dinitrophenoxy)-α-chlorocinnamaldehyde

A 250 ml 1-neck, round-bottomed flask equipped with magnetic stirrer and nitrogen adapter was thoroughly flamed and purged with nitrogen. To the flask was added 25 ml of dry dimethylformamide (DMF) and the flask was cooled to 0° C in an ice bath. Oxalyl chloride (2.5 g – 20 mmoles) was added dropwise to the flask (fuming) under nitrogen over a period of one-half hour, producing a white precipitate of Vilsmeyer complex. After the addition, the reaction mixture was stirred at 0° C for an additional one-half hour, at which time a solution containing 5.0 g (16.5 mmoles) of 3-acetylphenyl-3,4-dinitrophenyl ether dissolved in 25 ml of dry DMF was added dropwise, maintaining the bath temperature at 0° C. The cooling was then removed, and the reaction mixture stirred at room temperature for one hour, and then at 50° C for an additional hour. The contents of the flask were poured into 500 ml of cold, saturated sodium bicarbonate solution, and the crude product which precipitated was extracted into methylene chloride. The combined extracts were evaporated to a small volume and filtered through a 1 × 4 inches dry column of silica gel, eluting with additional methylene chloride. Evaporation of the elute to dryness yielded m-(3,4-dinitrophenoxy)-α-chlorocinnamaldehyde in the form of a yellow powder, m.p. 100°–101° C (40%).

Analysis: Calc'd for $C_{15}H_9N_2O_6Cl$: C,51.07; H,2.60; N,8.03; Cl, 10.17 Found: C,51.49; H,2.52; N,7.97; Cl, 9.98

(c) 4-(3-Ethynylphenoxy)-o-dinitrobenzene

To 50 ml of refluxing 1N sodium hydroxide solution, under a nitrogen atmosphere, was added a solution containing 10 g (0.028 mole) of m-(3,4-dinitrophenoxy)-α-chlorocinnamaldehyde dissolved in 50 ml of 1,4-dioxane. The dark mixture was refluxed for one-half hour at which time the solution was cooled and acidified with 10% sulfuric acid. The reaction mixture was extracted with several 50 ml portions of ether, and the combined extracts evaporated to dryness. The residue was chromatographed on a 1 × 12 inches dry column of silica gel. Elution of the column using 3/1 hexane/methylene chloride produced a first band of side-product. Further elution using 1/1 hexane/methylene chloride yielded a second band which contained the desired product. Evaporation of the eluate to dryness in vacuo afforded 2 g (25%) of 4-(3-ethynylphenoxy)-o-dinitrobenzene as light yellow crystals, m.p. 68°–69° C.

Analysis: Calc'd for $C_{14}H_8O_5$: C,59.16; H,2.84; N,9.86 Found: C,59.01; H,2.82; N,9.85

(d) 4-(3-Ethynylphenoxy)-o-phenylenediamine

To a rapidly stirred suspension of 25 g (0.38 g atom) of powdered zinc in 25 ml of concentrated ammonium hydroxide was added a solution containing 5.0 g (17.6 mmoles) of 4-(3-ethynylphenoxy)-o-dinitrobenzene dissolved in 25 ml of tetrahydrofuran. The mixture was stirred at room temperature for one-half hour, at which time an additional 5 ml of ammonium hydroxide was added, and the solution stirred an additional half hour. At that time, the reaction mixture was filtered by suction, and the residue was washed with several portions of tetrahydrofuran. The filtrate was extracted with several portions of ether, and the combined ether extracts washed with water. Evaporation of the organic layer in vacuo yielded a dark red oil. Chromatography of the residue on 1 × 12 inches dry column of silica gel afforded an initial red band (elution with methylene chloride) of side-product. Further elution using ethyl acetate produced a second band of desired product. Evaporation of solvent in vacuo yielded 3.3 g (84%) of 4-(3-ethynylphenoxy)-o-phenylene-diamine as a dark orange oil.

Analysis: Calc'd for $C_{14}H_{12}N_2O$: C,74.98; H,5.39; H,12.49 Found: C,74.43; H,5.31; N,11.98

EXAMPLE III p,p'-Bis[3-phenyl-6-(3-ethynylphenoxy)quinoxaline-2-yl]diphenylsulfide To a solution containing 1.25 g (2.77 moles) of 4,4'-(phenylglyoxaloyl)diphenylsulfide and 1 ml of glacial acetic acid dissolved in 25 ml of m-cresol was slowly added, under a nitrogen atmosphere, a solution containing 1.24 g (5.55 mmoles) of 4-(3-ethynylphenoxy)-o-phenylenediamine dissolved in 25 ml of methylene chloride. After completion of the addition, the reaction mixture was heated at reflux for one hour, at which time the methylene chloride was distilled out of the reaction mixture. The mixture was further heated to 150° C and maintained at that temperature for one hour. The cooled reaction mixture was then placed on a rotary evaporator and the cresol was removed under reduced pressure. The residual solid was recrystallized from dioxane/water to give 2 g (87.3%) of product, m.p. 140°–141° C.

Analysis: Calc'd for $C_{56}H_{34}N_4O_2S$: C,81.33; H,4.14; N,6.77 Found: C,81.53; H,3.89; N,6.93

EXAMPLE IV

Preparation of 1,3-Bis[3-(p'-phenoxyphenyl)-6-(3-ethynylphenoxy)-quinoxaline-2-yl]benzene To a solution containing 1.3 g (2.71 mmoles) of meta-bis(p'-phenoxyphenylglyoxalyl)benzene dissolved in 25 ml of dioxane and 0.5 ml of glacial acetic acid was added, under a nitrogen atmosphere, a solution containing 1.21 g (5.43 mmoles) of 4-(3-ethynylphenoxy)-o-phenylenediamine, dissolved in 25 ml of methylene chloride. The reaction mixture was heated to reflux to remove the methylene chloride then heated to 100° C and maintained at that temperature for one hour. The cooled reaction mixture was precipitated into water and the resulting pale yellow solid was isolated by filtration and dried under reduced pressure. The product was recrystallized from dioxane/water to give 2.1 g (87% yield).

Analysis: Calc'd for $C_{62}H_{38}N_4O_4$: C,82.86; H,4.24; N,6.20 Found: C,82.13; N,4.01; N,5.91

EXAMPLE V

Preparation of 1,4-Bis[3-phenyl-6-(3-ethynylphenoxy)quinoxaline)-2-yl]benzene

To a solution containing 1.3 g (3.79 mmoles) of para-bis(phenylglyoxalyl)benzene and 0.5 ml of glacial acetic acid was added, under a nitrogen atmosphere, 1.7 g (7.59 mmoles) of 4-(3-ethynylphenoxy)-o-phenylenediamine dissolved in 20 ml of methylene chloride. The reaction mixture was heated to reflux to remove the methylene chloride, then heated to 150° C and maintained at that temperature for one hour. The cooled reaction mixture was precipitated into methanol and the resulting white solid was isolated by filtration and dried under reduced pressure. The solid product was purified by chromatography on a dry column of silica gel (quartz column). Elution of the column with methylene chloride afforded a first band (fluorescent) containing the product. Evaporation of solvent in vacuo yielded 2.1 g (77%) of the product m.p. 204°–205° C.

Analysis: Calc'd for $C_{50}H_{30}N_4O_2$: C,83.54; H,4.22; N,7.79 Found: C,83.21; H,4.23; N,7.54

EXAMPLE VI

The reactive plasticizers prepared in Examples I, III, IV and V were characterized with respect to their melting point and temperature at which they would become inactive by polymerization. Small samples of reactive plasticizer were placed into small test tubes. The tubes were flushed with nitrogen and then were placed in a preheated metal block. After 12 hours at 280° C, the tubes were removed and allowed to cool. The glass transition temperatures of the cured plasticizer were then determined by thermomechanical analysis. The data obtained are shown below in Table I.

tic as described hereinbefore. This well known thermoplastic polymer was prepared from a solution condensation of diaminobenzidine and oxydibenzil and exhibited a glass transition temperature (Tg) of 285°–290° C. Various amounts of plasticizer and thermoplastic were dissolved in chloroform and coprecipitated into methanol. Small samples of the various mixtures were placed in small test tubes. The tubes were heated at 260° C or 280° C for 12 hours, removed and allowed to cool to room temperature. Thermal Mechanical Analysis (TMA) was determined on the non-cured and cured mixtures to determine the reduction in Tg or the effective lowering of the Tg for fabrication. The data obtained are shown below in Table II.

TABLE II

| Molecular Weight | % Thermoplastic | % Plasticizer | $Tg, °C^{(1)}$ Uncured | Cure Temp °C,12 hr | $Tg, °C^{(1)}$ Cured | Reduction$^{(2)}$ Tg, °C |
|---|---|---|---|---|---|---|
| 800 | 0 | 100 | 100 | 280 | 280 | — |
| 180,000 | 100 | 0 | 286 | 280 | 286 | — |
| 180,000 | 80 | 20 | 243 | 260 | 304 | 21 |
| 180,000 | 70 | 30 | 226 | 260 | 307 | 60 |
| 22,000 | 70 | 30 | 234 | 280 | 317 | 52 |

$^{(1)}$Determined by TMA at a heating rate of 20° C/min.
$^{(2)}$Reduction in Tg of thermoplastic resulting from plasticizer addition.

The data in the foregoing examples demonstrate that the bisethynyl quinoxaline compounds are effective reactive plasticizers for thermoplastic resins. Thus, the plasticizers raise the softening points of the cured mixtures of plasticizer and resin above the softening point of the uncured resin. The thermoplastic resin is thereby rendered suitable for use in fabricating fiber-reinforced composites.

As will be evident to those skilled in the art, modifications of the present invention can be made in view of the foregoing disclosure without departing from the spirit and scope of the invention.

We claim:

TABLE I
REACTIVE PLASTICIZERS

| Plasticizer | Ar | R | m.p., °C | $Tpi^{(1)}$ °C | $Tp\ max^{(2)}$ °C | $Tg^{(3)}$ °C |
|---|---|---|---|---|---|---|
| I | –⟨phenyl⟩–O–⟨phenyl⟩– | –⟨phenyl⟩– | 100° C | 220 | 250 | 280° |
| III | –⟨phenyl⟩–S–⟨phenyl⟩– | –⟨phenyl⟩– | 140 | 225 | 263 | 337 |
| IV | –⟨phenyl⟩– | –⟨phenyl⟩–O–⟨phenyl⟩– | 95 | 180 | 263 | 278 |
| V | –⟨phenyl⟩– | –⟨phenyl⟩– | 205 | 205 | 255 | 348 |

$^{(1)}$Tpi = Temperature of polymerization (initial) as determined by DSC 20° C/min.
$^{(2)}$Tp max = Temperature of polymerization (maximum) as determined by DSC.
$^{(3)}$Tg = Glass transition temperature after heating at 280° C for 12 hrs.

General structure:
HC≡C–⟨phenyl⟩–O–⟨phenyl⟩–[quinoxaline N,N / R,R]–Ar–[quinoxaline N,N / R,R]–⟨phenyl⟩–O–⟨phenyl⟩–C≡CH

EXAMPLE VII

Samples of the plasticizer prepared in Example I were mixed in various percentages with different molecular weights of a polyphenylquinoxaline thermoplas- 1. A bis-ethynyl quinoxaline compound having the following formula:
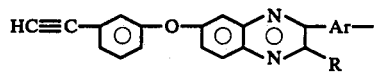
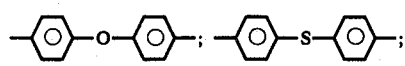
wherein Ar is 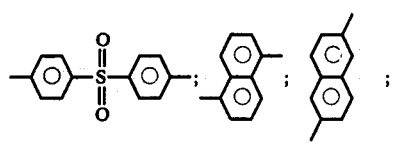
or 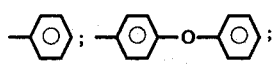; and R is hydrogen;
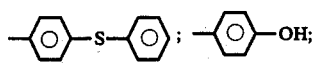
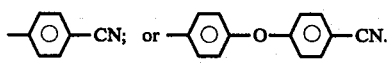
2. The compound of claim 1 in which Ar is
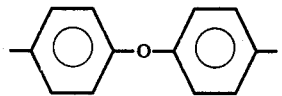
and R is
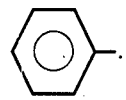
3. The compound of claim 1 in which Ar is
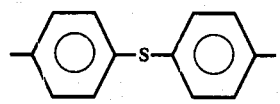
and R is
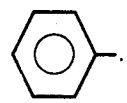
4. The compound of claim 1 in which Ar is
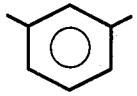
and R is
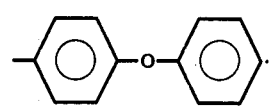
5. The compound of claim 1 in which Ar is
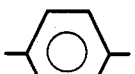
and R is
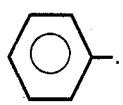
6. The compound of claim 1 in which Ar is
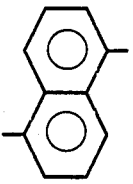
and R is hydrogen.